(12) United States Patent
Hebda et al.

(10) Patent No.: US 12,535,716 B2
(45) Date of Patent: Jan. 27, 2026

(54) LENS CAP WITH BISTABLE MEMBRANE FOR SPRING EFFECT BETWEEN CONCAVE AND CONVEX POSITIONS

(71) Applicant: Aptiv Technologies AG, Schaffhausen (CH)

(72) Inventors: Pawel Hebda, Cracow (PL); Maciej Krzanowski, Cracow (PL); Witold Poreda, Cracow (PL); Jakub Szela, Cracow (PL); Miroslaw Zurowski, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 328 days.

(21) Appl. No.: 18/353,704

(22) Filed: Jul. 17, 2023

(65) Prior Publication Data

US 2024/0019764 A1 Jan. 18, 2024

(30) Foreign Application Priority Data

Jul. 18, 2022 (EP) .................................. 22185534

(51) Int. Cl.
*G03B 11/04* (2021.01)

(52) U.S. Cl.
CPC .................................. *G03B 11/041* (2013.01)

(58) Field of Classification Search
CPC .................................................. G03B 11/041
See application file for complete search history.

(56) References Cited

U.S. PATENT DOCUMENTS

| 2013/0129338 A1* | 5/2013 | Dowell | G02B 1/14 359/511 |
|---|---|---|---|
| 2023/0129338 A1 | 4/2023 | Jain et al. | |

FOREIGN PATENT DOCUMENTS

| CN | 109305103 | | 2/2019 |
| JP | 4056823 | | 3/2008 |
| JP | 2011197114 A | * | 10/2011 |
| JP | 2012002943 A | * | 1/2012 |
| WO | 2021100227 | | 5/2021 |

OTHER PUBLICATIONS

"Extended European Search Report", EP Application No. 22185534.9, Jan. 3, 2023, 8 pages.
Examination Report regarding EP Application No. 22185534.9, dated Jul. 23, 2025.
Legenday Technology Silicone Product Factory: "manufacture Food Grade BPA free Silicone durable custom Baby Bowl smal size," XP093297138, URL: <https://www.youtube.com/watch?v=wIQsZNJZf2o,> dated Jul. 4, 2022.

* cited by examiner

*Primary Examiner* — Paul C Lee
(74) *Attorney, Agent, or Firm* — Harness, Dickey & Pierce, P.L.C.

(57) ABSTRACT

A lens cap for protecting a lens having an optical portion, the lens cap having a base with a spring membrane, and a sidewall arranged to surround the optical portion, so as to create a cavity between the base and the optical portion. The spring membrane arranged to be movable between a deformed position wherein the spring membrane is deformed toward the optical portion, and a rest position wherein the spring membrane extends away from the optical portion.

19 Claims, 2 Drawing Sheets

LENS CAP WITH BISTABLE MEMBRANE FOR SPRING EFFECT BETWEEN CONCAVE AND CONVEX POSITIONS

INCORPORATION BY REFERENCE

This application claims priority to European Patent Application No. EP22185534.9, filed Jul. 18, 2022, the disclosure of which is incorporated by reference in its entirety.

BACKGROUND

Lens, and in particular lens for automotive cameras, require high cleanliness of optical path for proper and reliable function. The shipping of camera lens needs special packaging and protection caps. The protection caps assure cleanliness of the lens in optical areas.

The lens cap for lens protection are known in the prior art.

In particular, it is known to provide a cap with a disk shaped base and a sidewall arranged to surround a lens.

The drawbacks of the lens according to the prior art are that, when the lens cap is removed from the lens after the shipping (e.g. at the time of mounting), a decrease of pressure inside the cap occurs. In other words, there is a cavity between the cap and the lens for protection and cleanliness purpose, and when the cap is removed from the lens, there is a depression inside the cavity, and air is sucked in the cavity thereby leading to ingress of dust particles into a clean area. Further, the depression may cause some difficulties for the operator to easily remove the cap from the lens.

Therefore, there is a need for another kind of solution that is a good trade-off for overcoming the different drawbacks of the prior art.

In particular, there is a need to solve the problems of ingress of dirt at opening of the lens cap, of easy removal of cap and of protection during shipping and removal, while being easy to manufacture and cost efficient.

SUMMARY

The present disclosure concerns a lens cap for protecting a lens having an optical portion, the lens cap having: a base with a spring membrane, a sidewall extending from the base and dimensioned to fit around the lens, wherein the spring membrane is arranged to be movable between: a first position wherein the spring membrane is arranged at a first distance from the optical portion, a second position wherein the spring membrane is arranged at a second distance from the optical portion, and wherein the second distance is greater than the first distance.

In other words, the disclosure concerns a lens cap for protecting a lens having an optical portion, the lens cap having: a base with a spring membrane, a sidewall arranged to surround the optical portion, so as to create a cavity between the base and the optical portion, wherein the spring membrane is arranged to be movable between: a deformed position wherein the spring membrane is deformed toward the optical portion, and a rest position wherein the spring membrane extends away from the optical portion.

This allows to provide a lens cap limiting the ingress of dirt at opening of the lens cap, easing the removal of the lens cap and improving the protection during shipping and removal, while being easy to manufacture and cost efficient.

Further, this allows to avoid any decrease of pressure inside the cavity during removal of the lens cap. Indeed, when a force is applied on an outer portion of the spring membrane by an operator, the pressure inside the cavity is increased. When the cap is removed (by extraction or pull) after the application of said force, the increased pressure in the cavity avoids any suction of dirt in the cavity, and thereby avoids or limits any deposit of dirt on the optical portion.

The present disclosure significantly improves the cleanliness of the optical portion of the lens during removal of the lens cap, thereby matching the high cleanliness requirement of the lens and the proper and reliable functioning.

Advantageously, the first position is a deformed position, an activated position or also called a forced position. Said position is a position wherein the lens cap stands when a force is applied on it, preferably in a direction towards a center of the lens cap from an outer side of the lens cap. The center of the lens cap is preferably in an inner side of the lens cap. In an embodiment, the force may be applied in the same direction as the direction of extension of the sidewall.

Advantageously, the second position is a rest position. The rest position is a position wherein the lens cap stands when no force is applied on it. That is to say, in the rest position, the spring membrane forms a bulge or is bulged, towards the outer side.

Advantageously, the base is arranged to face the optical portion, to be arranged in regard of the optical portion, or to be arranged nearby, or at proximity of, the optical portion.

Advantageously, the spring membrane is arranged to be: convex when in the rest position (e.g. in the second position), and concave when in the deformed position (e.g. in the first position).

This allows to provide an increase of pressure when an operator push on the spring membrane. That is, when the operator removes the cap (by e.g. additionally pulling the lens cap, for example at the level of the sidewall or at the level of a gripping portion of the sidewall), there is no decrease of pressure inside the cavity. This avoid or limit the introduction or suction of dirt or particles in the cavity. That is, the cavity remains clean. It is to be noted that the cavity and the optical portion are preferably cleaned initially, that is to say before the initial mounting of the lens cap on the lens (e.g. before shipping).

Advantageously, the sidewall has an inner portion arranged to be in contact with the lens, when the spring membrane is in the second (e.g. rest) position.

This allows to limit the ingress of dirt or particles during shipping, and to have an air tight sealing function.

Advantageously, the sidewall is arranged to be deformed away from the lens (or deformed outwardly), when the spring membrane is in the deformed position, e.g. in the first position.

This allows to ease the removal of the lens cap.

Advantageously, the lens cap further has an inner sidewall arranged between a center of the lens cap and the sidewall.

Advantageously, the sidewall is arranged at a first distance from a center of the lens cap, and the lens cap further has an inner sidewall arranged at a second distance from the center, which is lower than the first distance.

Advantageously, the inner side wall is arranged closer from the center of the lens cap than the sidewall is.

Advantageously, the inner sidewall has an end portion arranged to be in contact with a contact surface of the lens facing the base.

This allows to improve the removal of the lens cap, in particular by rendering it easier, and to improve the overpressure in the cavity when an operator applies a force on the outer portion of the spring membrane.

Advantageously, the end portion has a coating.

Advantageously, the coating is in metal, bronze, plastic, polymer or any other suitable material or combination thereof, so as to avoid any friction or stick/slip between the end portion and the contact surface of the lens.

Advantageously, the sidewall has a coated portion on its inner portion.

Advantageously, the coating is in metal, bronze, plastic, polymeric or any other suitable material or combination thereof, so as to avoid any friction or stick/slip between the inner portion and the lens.

Advantageously, the coating of the inner portion of the sidewall or the coating of the end portion of the inner sidewall may be similar or different.

Advantageously, the spring membrane is arranged to face the optical portion.

Advantageously, the sidewall has a grip portion arranged in opposition to the spring membrane, when the spring membrane is in the second position (e.g. in the rest position).

This allows to ease the removal of the lens cap. This allows to improve the grip when the operator wants to pull the lens cap at the level of the sidewall.

Advantageously, the base has an outer portion arranged between the sidewall and the spring membrane.

Advantageously, the outer portion is straight, and preferably perpendicular with the sidewall.

Advantageously, the sidewall and/or the inner side wall may be perpendicular to the base or to the outer portion.

Advantageously, the outer portion is arranged to be aligned with a midway position between the second position and the first position.

Advantageously, the outer portion is arranged to be aligned with a midway position between the rest position and the deformed position.

This allows to ease the removal of the lens cap and to improve the bending of the spring membrane when an operator press or push the spring membrane. Thereby, an overpressure is created in the cavity and any dirt or particle is avoided when the lens cap is removed from the lens.

Advantageously, the second position (e.g. rest position) is a stable position.

Advantageously, the spring membrane is arranged to be movable in an intermediate instable position, between the second position (e.g. rest position) and the first position (e.g. first position).

This allows to ensure that an overpressure is created during a period of time wherein the force is applied onto the spring membrane by the operator. Further, this allows that, if the operator release the force before finalizing the removal of the lens cap (e.g. trial of removal), any dirt is prevented to enter in the cavity.

Advantageously, the first position and the second position are arranged on each side of a virtual central flat position.

Advantageously, when in the rest position, the spring membrane extends outwardly from the center of the lens cap.

Advantageously, the spring membrane is arranged to rest or come back to the rest position if no (external) force is applied on the spring membrane.

Advantageously, the spring membrane may be stable in the rest position and in an extreme deformed position, wherein the spring membrane is deformed at most.

Advantageously, the sidewall is arranged to pinch the lens.

This allows to ensure that no dirt is introduced in the cavity during shipping and to improve the removal of the lens cap in a clean manner, by cooperating with the arrangement of the spring membrane.

Advantageously, the base is generally disk shaped.

Advantageously, the sidewall is an annular ring portion.

Advantageously, the inner sidewall is an inner annular ring portion.

Advantageously, the sidewall has a guiding portion, arranged to guide the lens cap when the lens cap is removed from the lens.

Advantageously, the base, the spring membrane, the sidewall and the inner sidewall are made in any suitable material such as plastic, elastic material, elastomer, polymer, rubber, or the like, and any combination thereof.

Advantageously, the lens cap may be molded or injected, and may be monolithic or assembled. Further, the lens cap may be made of different materials.

Advantageously, the lens cap is cleanable by air or by liquid. This allows to achieve high cleanliness requirements and protect in best way the optical path (e.g. back-side of the lens cap or of the lens), even before first usage at the supplier of the lens. That is, the supplier/manufacturer of the lens could be able, at an early stage of the manufacturing, to clean the cap and the lens before assembling together. Further, there is the one time use option, wherein the lens cap is scrapped after first usage, or the reuse option, wherein, in addition to the cleanability requirement, the lens cap shall operate within its elastic range. This means that the lens cap should not deform permanently after the first usage and thereby could be sent back to the lens supplier for cleaning and re-usage, that is to say e.g. after the lens have been integrated to the camera for final use. In other words, when the lens is mounted, the lens cap has no more utility for the mounted lens and could be re-used for another lens.

Advantageously, the lens cap protects the inner side of the lens, that is to say the one closer to the imager not facing to the car. This allows to protect the camera imager (optical sensor) the most as contaminations which would be deposit on the imager completely block the light at individual pixels.

BRIEF DESCRIPTION OF THE DRAWINGS

Other features, purposes and advantages of the disclosure will become more explicit by means of reading the detailed statement of the nonrestrictive embodiments made with reference to the accompanying drawings.

DETAILED DESCRIPTION

The present disclosure relates to a lens cap for protecting lens, for example lens of camera, in particular during shipping and removing of the lens cap. This is of interest in the automotive industry in particular.

The present disclosure relates to a lens cap 100 allowing an easy removal of the lens cap 100 from a lens 200, so as to protect the lens 200 during shipping and at the time of removing the lens cap 100, and to avoid or limit any ingress of dirt or particles and the like onto an optical portion 201 of the lens 200, for better functioning of the lens 200, for example when the lens 200 is installed on a vehicle or a car.

Figure 1:
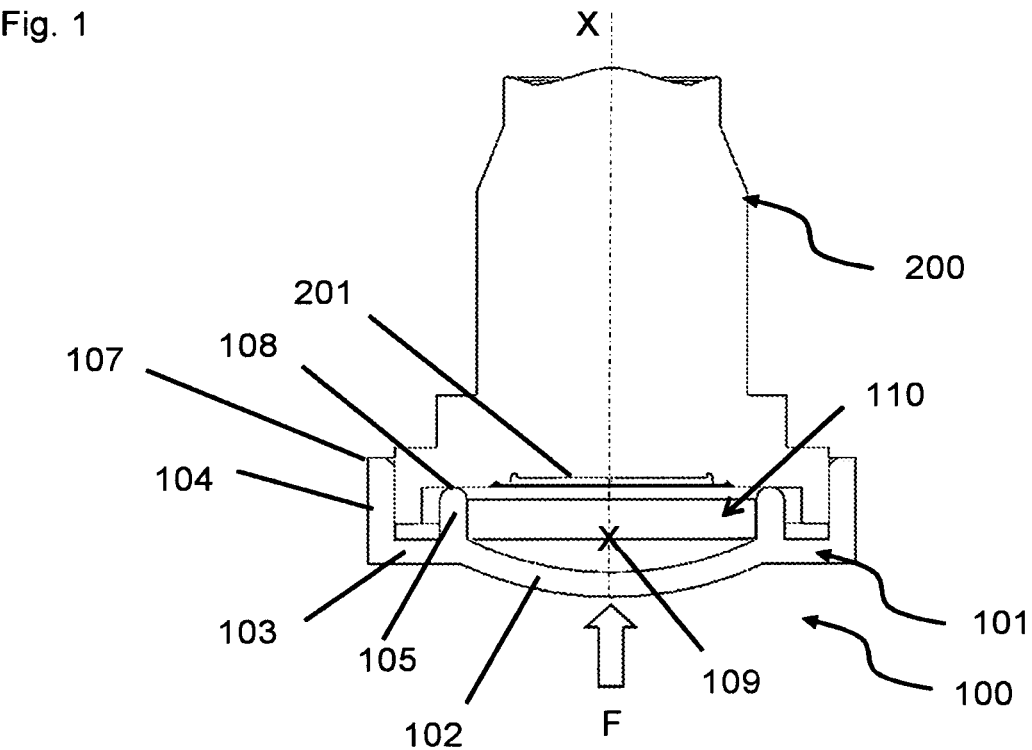
FIG. 1 illustrates a lens cap according to a first embodiment with the lens cap mounted on a lens, in a rest position.

FIG. 1 illustrates the lens cap 100 according to the first embodiment with the lens cap 100 mounted on the lens 200, in a rest position.

The lens cap 100 has a base 101 with a spring membrane 102. The spring membrane 102 is preferably made out of an elastomer.

The lens cap 100 further has a sidewall 104 arranged to surround the optical portion, so as to create a cavity 110 between the base 101 and the optical portion 201. In other words, the lens cap 100 is arranged to cover the lens 200 at the level of (or at the side of) the optical portion 201.

The spring membrane 102 is arranged to be movable between:
 a first position wherein the spring membrane 102 is arranged at a first distance from the optical portion 201,
 a second position wherein the spring membrane 102 is arranged at a second distance from the optical portion 201, and
wherein the second distance is greater than the first distance.

The first position and the second position are arranged on each side of a virtual central flat position, wherein the spring membrane 102 is virtually flat. That is, the virtual central flat position is aligned with an outer portion 103 if the base 101.

In other words, the spring membrane 102 is movable between:
 the first position (e.g. a deformed position) wherein the spring membrane 102 is deformed toward (or in direction of) the optical portion 201, and
 the second position (e.g. a rest position) wherein the spring membrane 102 extends away from the optical portion 201, that is to say in an opposite direction compared to direction of deformation of the deformed position, so as to provide a spring effect of the spring membrane 102.

The spring membrane 102 is arranged to be:
convex when in the rest position, and
concave when in the deformed position. The virtual central flat position is an inflection position, wherein the spring membrane change its convexity (or its concavity), that is to say change from convex to concave (and/or change from concave to convex).

In the rest position, no force is applied onto the spring membrane 102.

That is, the spring membrane 102 is arranged to project in a direction opposite from the optical portion 201.

The cavity 110 may be reduced in volume when the spring membrane 102 is in the deformed position compared to the volume of the cavity 110 in the rest position. This allows to create an overpressure in the cavity 110 when a force F is applied by an operator on the spring membrane 102. That is, the greater the force F applied, the more the spring membrane 102 deforms and the more the pressure increases in the cavity 110.

The sidewall 104 has an inner portion arranged to be in contact with the lens 200, when the spring membrane 102 is in the rest position. Preferably, an air tight contact is provided, so as to avoid any ingress of dirt in the cavity 110 during shipping.

The lens cap 100 may further have an inner sidewall 105.

The inner sidewall 105 is arranged between the sidewall 104 and a center 109 of the lens cap 100.

Preferably, the inner sidewall 105 is nearby, or abuts, a contact surface of the lens 200, at the level of an end portion 108 of the inner sidewall 105. Preferably, the contact surface is around the optical portion 201.

The end portion 105 may further have a coating to avoid any friction or stick/slip of the end portion 105, when the force F is applied on the spring membrane 102.

The spring membrane 102 is preferably arranged to face the optical portion 201.

The cavity 110 is generally speaking between the base 101, the sidewall 104 and the optical portion 201. It could be considered also that the cavity 110 is defined by the spring membrane 102, the inner sidewall 105 and the optical portion 201. That is, all in all, the definition of the cavity 110 is a space between the lens cap 100 and the optical portion 201, so as to allow for a clean area to be provided nearby (or at proximity of) the optical portion 201, and avoid any ingress of dirt and deposit of dirt onto the optical portion 201 when removing the lens cap 100. The final aim is to ensure a good and clean functioning of the lens 200, in particular its optical portion 201.

It is to be noted that the force F may be applied toward the center 109 of the lens cap 100, toward the lens 200 or toward the optical portion 201.

Figure 2:
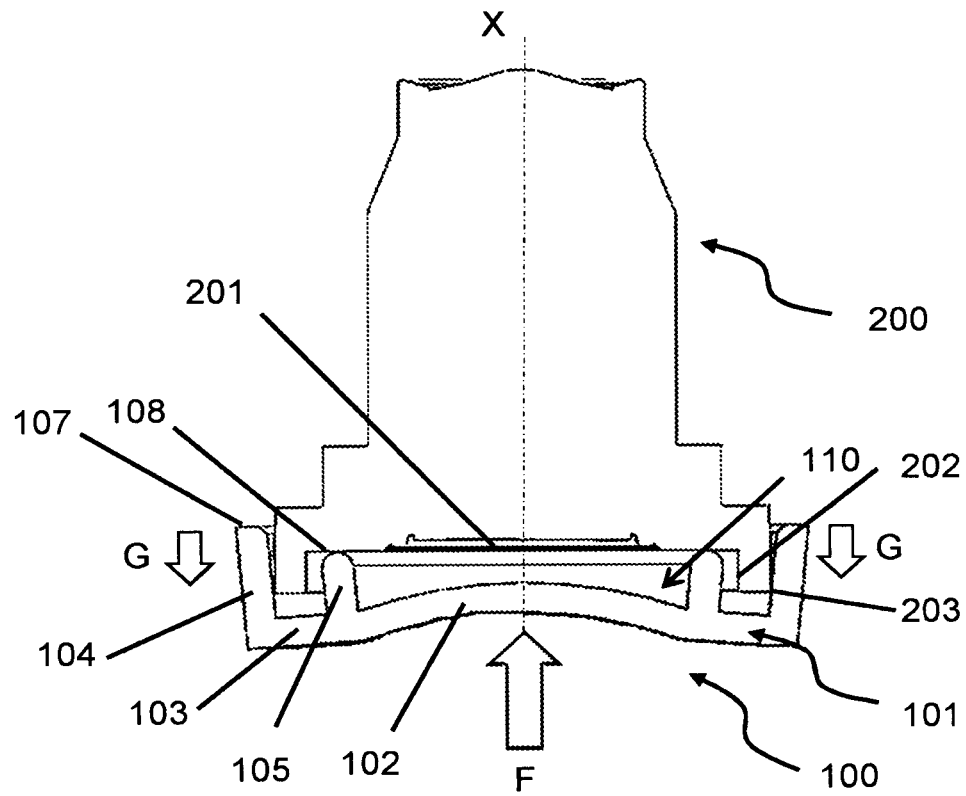
FIG. 2 illustrates the lens according to the first embodiment, in a deformed position.

FIG. 2 illustrates the lens according to the first embodiment, in a deformed position.

The reference numbers are kept as far as possible between the FIGS. 1 and 2.

When the force F is applied onto the spring membrane 102, the spring membrane 102 goes to the deformed position, toward the optical portion 201, as illustrated in FIG. 2.

When the (pushing or pressing) force F is applied, the sidewall 104 may be deformed away from the lens 200 (e.g. the sidewall 104 is opened), so as to ease the removal of the lens cap 100. That is, the sidewall 104 is movable between a pinched position (when the spring membrane 102 is in the rest position), and a opened position (when the spring membrane 102 is in the deformed position).

Further, when the force F is applied onto the spring membrane 102, the end portion 108 may abut and slide on the contact surface of the lens 200, and facilitate the bending of the spring membrane 102, thereby improving the general functioning the lens cap 100. The inner sidewall 105 may finally abut (after sliding) on an inner side portion 202 of the lens 200, thereby providing an end of stroke abutment for the inner sidewall 105.

When the force F is applied, the sidewall 104 may slide, rock and/or rotate on an outer side portion 203 of the lens 200, so as to ease the removal of the lens cap 100.

The operator may need to apply a pulling force G (or a traction force G) on the sidewall 104, and preferably on a gripping portion 107 of the sidewall 104, so as to finally remove the lens cap 100. The pulling force G is preferably applied meantime the pushing force F. A preferred way of applying such forces is to apply the pushing force with the thumb and to apply the pulling force with the other fingers such as the index finger or middle finger.

That is, a high lens cleanliness in optical area is achieved without the need of additional cleaning process when unpacking at assembly line. The removal of the lens cap 100 is thereby improved.

In other words, the lens cap 100 is arranged to be elastically movable or tiltable between the first position and the second position. The spring membrane 102 is dome shaped, and may move on each side of a chord plane (or spherical cap or string plane or medium plane), between the first position and the second position. The medium plane is preferably the plane at a fixed end of the sidewall 104.

Figure 3:
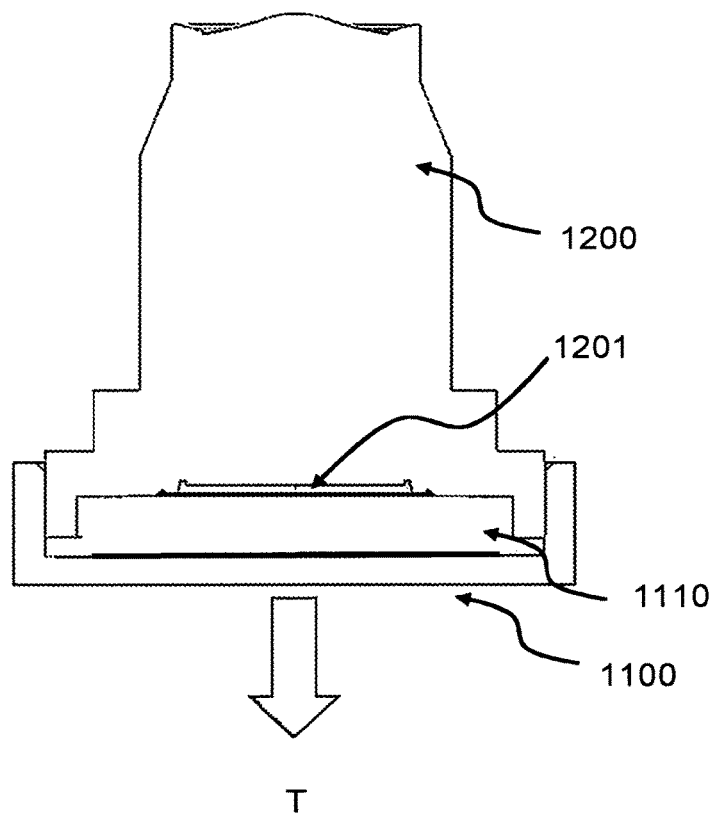
FIG. 3 illustrates a conventional lens cap.

FIG. 3 illustrates a conventional lens cap 1100. The conventional lens cap 1100 may be removed from the conventional lens 1200 by applying a pulling force T. When the pulling force T is applied, a depression may occur in the conventional cavity 1110 between the conventional lens cap 1100 and a conventional optical portion 1201 of the conventional lens 1200. Thereby, dirt may enter in the conventional cavity 1110 when the conventional lens cap 1100 is removed, and pollution of the conventional optical portion 1201 may occur, thereby limiting the functioning of the conventional lens 1200.

Figure 4:
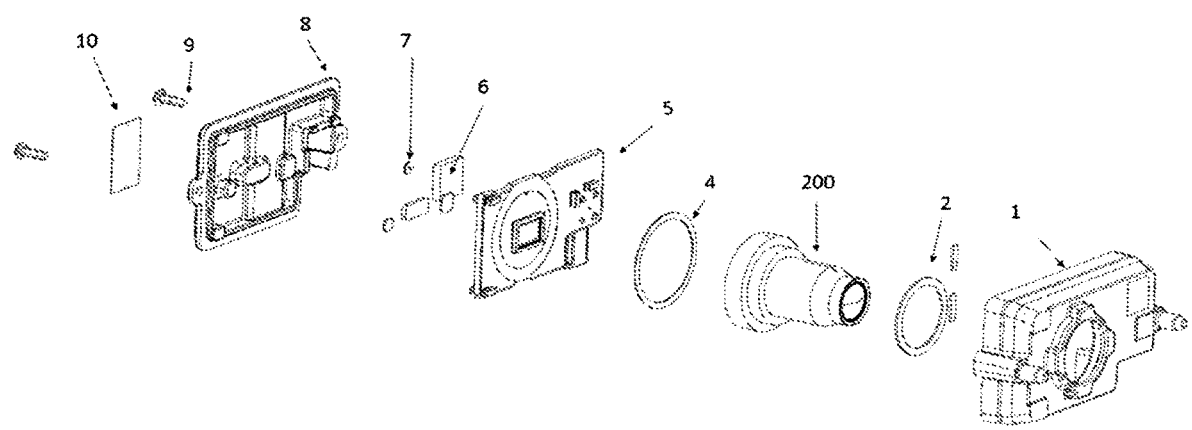
FIG. 4 illustrates the lens mounted in a camera.

FIG. 4 illustrates the lens mounted in a camera.

The camera is illustrated with the lens 200 integrated to it. The camera further has a lens holder 1, adhesives 2, 4, a PCB assembly, thermal pads 6, a membrane 7, a cover 8, a screw 9 and a label 10.

It will be understood that various modifications and/or improvements obvious to the person skilled in the art may be made to the various embodiments of the disclosure described in the present description without departing from the scope of the disclosure defined by the appended claims. The different embodiments can be combined whenever possible.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. A lens cap for protecting a lens having an optical portion, the lens cap comprising:
    a base with a spring membrane; and
    a sidewall extending from the base and dimensioned to fit around the lens, where the spring membrane is arranged to be movable between:
        a first position where the spring membrane is arranged to be concave and at a first distance from the optical portion, and
        a second position where the spring membrane is arranged to be convex and at a second distance from the optical portion, the second distance being greater than the first distance.

2. The lens cap according to claim 1, wherein the sidewall has an inner portion arranged to be in contact with the lens when the spring membrane is in the second position.

3. The lens cap according to claim 1, wherein the sidewall is arranged to be deformed away from the lens when the spring membrane is in the first position.

4. The lens cap according to claim 1, further comprising:
    an inner sidewall arranged between a center of the lens cap and the sidewall.

5. The lens cap according to claim 4, wherein the inner sidewall has an end portion arranged to be in contact with a contact surface of the lens facing the base.

6. The lens cap according to claim 5, wherein the end portion has a coating.

7. The lens cap according to claim 1, wherein the spring membrane is arranged to face the optical portion.

8. The lens cap according to claim 1, wherein the sidewall has a grip portion arranged in opposition to the spring membrane when the spring membrane is in the second position.

9. The lens cap according to claim 1, wherein the base has an outer portion arranged between the sidewall and the spring membrane.

10. The lens cap according to claim 9, wherein the outer portion is straight.

11. The lens cap according to claim 10, wherein the outer portion is perpendicular with the sidewall.

12. The lens cap according to claim 10, wherein the outer portion is arranged to be aligned with a midway position between the second position and the first position.

13. The lens cap according to claim 1, wherein the second position is a stable position.

14. The lens cap according to claim 1, wherein the spring membrane is arranged to be movable in an intermediate instable position, between the second position and the first position.

15. The lens cap according to claim 1, wherein the first position and the second position are arranged on each side of a virtual central flat position.

16. The lens cap according to claim 1, wherein:
    the base has a straight outer portion arranged between the sidewall and the spring membrane, and
    the second position is a stable position.

17. The lens cap according to claim 1, wherein:
    the sidewall has an inner portion arranged to be in contact with the lens when the spring membrane is in the second position, and
    the sidewall is arranged to be deformed away from the lens when the spring membrane is in the first position.

18. The lens cap according to claim 1, wherein:
    the first position is a deformed position, and
    the second position is a rest position.

19. A lens having an optical portion at one end and a lens cap covering the optical portion, the lens cap comprising:
    a base with a spring membrane; and
    a sidewall extending from the base and dimensioned to fit around the lens, where the spring membrane is arranged to be bistable and movable between:
        a first position where the spring membrane is arranged to be concave and at a first distance from the optical portion, and
        a second position where the spring membrane is arranged to be convex and at a second distance from the optical portion, the second distance being greater than the first distance,
    wherein the second position of the spring membrane is arranged to face away from the optical portion.

* * * * *